(12) United States Patent
Lozon et al.

(10) Patent No.: US 6,252,192 B1
(45) Date of Patent: Jun. 26, 2001

(54) EDM TOOL HOLDER

(75) Inventors: Robert J. Lozon, St. Clair; Edward C. Olszewski, Smith Creek, both of MI (US)

(73) Assignee: Precision Die & Machine Company, St. Clair, MI (US)

(*) Notice: Subject to any disclaimer, the term of this patent is extended or adjusted under 35 U.S.C. 154(b) by 0 days.

(21) Appl. No.: 09/484,971

(22) Filed: Jan. 18, 2000

Related U.S. Application Data

(63) Continuation-in-part of application No. 09/171,715, filed as application No. PCT/US97/23942 on Dec. 24, 1997, now Pat. No. 6,015,961.

(51) Int. Cl.$^7$ ............................... B23H 1/00; B23H 7/26
(52) U.S. Cl. ..................................... 219/69.15; 264/328.1
(58) Field of Search ........................... 219/69.15, 69.11, 219/69.2; 264/328.1; 269/309, 900

(56) References Cited

U.S. PATENT DOCUMENTS

| | | |
|---|---|---|
| 4,395,613 * | 7/1983 | Barr et al. . |
| 4,425,060 * | 1/1984 | Bilz et al. . |
| 4,621,821 | 11/1986 | Schneider . |
| 4,815,780 | 3/1989 | Obrist . |
| 4,855,558 | 8/1989 | Ramsbro . |
| 4,922,074 * | 5/1990 | Sebzda, Sr. . |
| 5,065,991 | 11/1991 | Schneider . |
| 5,415,384 | 5/1995 | Obrist et al. . |
| 5,788,225 * | 8/1998 | Iwata et al. . |
| 6,015,961 * | 1/2000 | Lozon et al. . |
| 6,160,236 * | 12/2000 | Nordquist . |

* cited by examiner

Primary Examiner—Tom Dunn
Assistant Examiner—Jonathan Johnson
(74) Attorney, Agent, or Firm—Brooks & Kushman P.C.

(57) ABSTRACT

A tool holder for electric discharge machining includes a block of molded plastic mountable to an EDM tool. The block is shaped to provide locating reference faces adapted to abut a mounting face on an EDM machine and thereby locate the block in a Z-direction on the EDM machine. An electric conductor is embedded in the block and has portions exposed (1) at the faces for electric contact with the mounting face on an EDM machine, and (2) for electric contact with a tool mounted on the block, whereby an electric circuit is completed between the tool and an EDM machine on which the holder is mounted. Finally, the block has a clamp for clamping the block on an EDM machine to urge the reference faces against the mounting face on such machine.

14 Claims, 10 Drawing Sheets

EDM TOOL HOLDER

RELATED APPLICATION

This application is a continuation-in-part of our prior U.S. application Ser. No. 09/171,715 filed Oct. 23, 1998 now U.S. Pat. No. 6,015,961 which was the U.S. National Phase of PCT application Ser. No. PCT/US97/23942 filed Dec. 24, 1997.

TECHNICAL FIELD

This invention relates to tool holders for EDM tooling.

BACKGROUND OF THE INVENTION

Several patents have issued since the commercial success of electric discharge machining (hereinafter "EDM") relating to the devices which can hold EDM tooling so that it may be repeatably placed in operable position in the EDM machine and removed therefrom. Typically such devices, which are herein termed "tool holders", may be repetitively positioned with great accuracy in and thereafter removed from the EDM machine many times during the course of a production run.

In the present state of the art, EDM tooling, also sometimes referred to as EDM electrodes, is formed from stock which is mounted in a tool holder, the tooling is then created, and thereafter remains with the holder throughout the useful life of the tooling. The tooling is created in the tool holder to avoid the problem of accurately positioning the tooling in the proper X, Y and Z orientations in the tool holder. The tool holder has certain locating devices that enables the holder (and in turn the tooling) to be repeatably positioned very accurately in the EDM machine. Thus, for each EDM tool, there is a tool holder. Tool holders of the prior art useable in EDM machines are shown in the following representative U.S. Pat. Nos. 4,621,821; 4,815,780; 4,855,558; 5,065,991; 5,415,382.

Presently, EDM tool holders are machined of metal. Such holders typically sell for $40.00 or more. As there must be one such holder for each EDM tool, users of such tooling tie up substantial monies just in the cost of the holders. Accordingly, inventory costs merely for tool holders become a significant item in a company's tooling inventory.

In addition to involving significant inventory costs, the prior art tool holders are made up of a collection of individual parts. For example, in the case of U.S. Pat. No. 4,815,780, there is a centering disk 13 which is held to the surface of a mounting plate 6 of the tool holder 2 by four screws 51. The manufacture and assembly of these separate pieces not only is expensive but should this plate shift as a result of the tool holder being bumped, a $60,000 die being machined may be ruined because the tool holder was not positioned accurately in the EDM machine when it made its cut in the die. U.S. Pat. No. 5,065,991 discloses a generally similar centering disk and the same shortcomings are present in such arrangement.

In U.S. Pat. No. 4,855,558, tool holder 2 is made of metal and has four machined slots in the upper surface 30 and the flanks are cut to provide slightly bowed recesses such as at 37b as shown in FIG. 4 so that when the rail 68 of the chuck 1 is drawn into the slot, the lip 38d deflects downwardly along the Z-axis. Forming the downwardly bowed recesses involves difficult machining, raising the cost of the tool holders.

SUMMARY OF THE INVENTION

We have developed a tool holder construction that reduces the cost of EDM tool holders to a fraction of today's cost and substantially reduces the likelihood that an accidental bumping of the tool holder will upset the accuracy of its positioning when inserted in the EDM machine.

Instead of fabricating the tool holders of metal involving the machining and assembly of several parts, we make the tool holder by injection molding an appropriate plastic having insert-molded therein electrical conductors or any other parts which are desirably formed of metal.

Accuracy in repeated positioning of the tool holder is accomplished by utilizing the inherent flexibility of the plastic material of which the holder is formed to design positioning devices which provide extreme accuracy in X, Y and Z directions. Thus, unlike the prior art tool holders which comprise an assembly of parts that may later shift if the tool holder is accidentally bumped, or which require intricate machining for each holder increasing production costs of the holder, our tool holder is essentially one piece and there is no significant risk that parts may accidentally shift, destroying accuracy of the holder.

We have found that our tool holder may be made more rigid and less liable to permit deflection of the EDM tool carried thereby, in several applications, if the holder is made using a MIM (metal injection molded) core or the like, insert molded in a plastic block. In lieu of a MIM core, a powdered metal core or a cast metal core or the like, may be used. Such cores will provide increased rigidity to reinforce or "backup" the plastic material of the block. The plastic legs of our earlier design which locates the tool in the Z-axis are formed of the MIM core material, which also provides a conductive path between the EDM machine and the tool. A portion of the core is expanded for contact with the tool as in the other embodiments.

BRIEF DESCRIPTION OF THE PRESENT INVENTION

Figure 1:
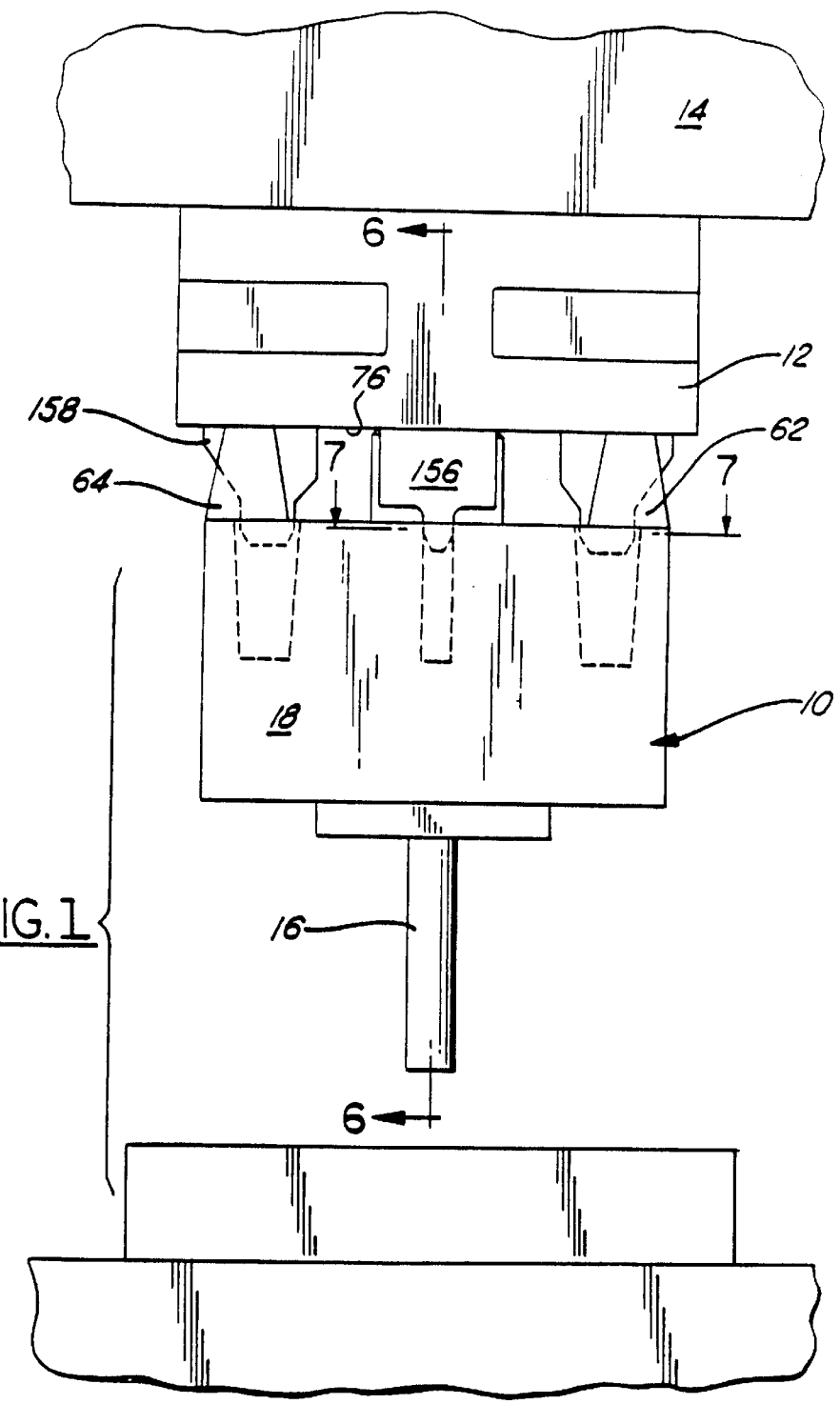
FIG. 1 is a side elevation view of our improved tool holder mounted on the chuck of an EDM machine.

In FIG. 1, we have shown somewhat schematically our improved tool holder 10 suspended from a coupling member or chuck 12 of an EDM machine 14. An EDM tool 16 is suspended from the holder. The tool may be locked in or mounted on the tool holder similar to the arrangement disclosed in U.S. Pat. No. 4,621,821, or in any other suitable fashion.

Our tool holder 10 comprises a plastic body member 18 which preferably is formed by injection molding utilizing a tough durable plastic which is stable at the operating temperatures to be encountered in EDM operations, i.e. normally not exceeding 250° to 300° F. A thermoplastic or thermosetting type resin may be used, though at present we have found a thermoplastic material sold by Phillips 66 under the trademark RYTON® to be preferred. This is a polyphenylene sulfide. The preferred grade is R-402XT.

General Electric makes a similar resin sold under the name SUPEC. In either case, the resin is glass fiber reinforced (30%). These resins will hold their configuration and desirable properties up to about 450° F. which is sufficient for normal operating temperatures for the oil bath in which the EDM operations are carried out.

In this application we have referred to the tool holder body member 18 as having been injection molded. This is the preferred method of forming it. However, it can be formed by any plastics molding technique which encapsulates components of the tool holder. Thus, in using the term "injection molding" or "injection molded", we intend to indicate a plastic body member formed by molding which encapsulates components therein.

The tool holder 10 carrying the tool 16 may be removed from and replaced in the EDM machine 12 many times in the course of a production run in which tool 16 is used to create a precisely dimensioned cavity in a succession of workpieces. It is of prime importance that the tool 16 always be accurately repositioned in the EDM machine after it has been removed. Accuracy within a range of plus or minus 0.01 millimeters is necessary and a very high repetitive position accuracy is expected. Such accuracy must be attained even though the tool holder is removed from and replaced in the EDM machine many times. In U.S. Pat. Nos. 4,815,780 and 4,855,558, which are incorporated herein by reference, such accuracy is attained by having centering pins 47 (see the '780 patent) or rails 68 (the '558 patent) on the coupling member or chuck of the EDM machine enter respectively apertures in a spring steel centering disk 13 ('780 patent) or slots such as 32 in the tool holder ('558 patent). In the case of the centering pins and the spring steel centering disk of the '780 patent, the pins have conically tapered ends which enter apertures 52 in the plate. The plate deflects axially along the Z-axis (in the direction of the entering movement of the pins) to accommodate the pins.

Similarly, rails of U.S. Pat. No. 4,855,558 enter the slots in the holder and cause the lips such as lip 38d in FIG. 4, to deflect axially along the Z-axis as the rail enters. There are four such pins or rails arranged circumaxially on the chuck which enter correspondingly arranged apertures or slots on the tool holder and these serve to fix the tool holder on the chuck along the X and Y axes. Accurate positioning along the Z-axis is provided by having abutting flat surfaces on the chuck and tool holder.

Figure 6:
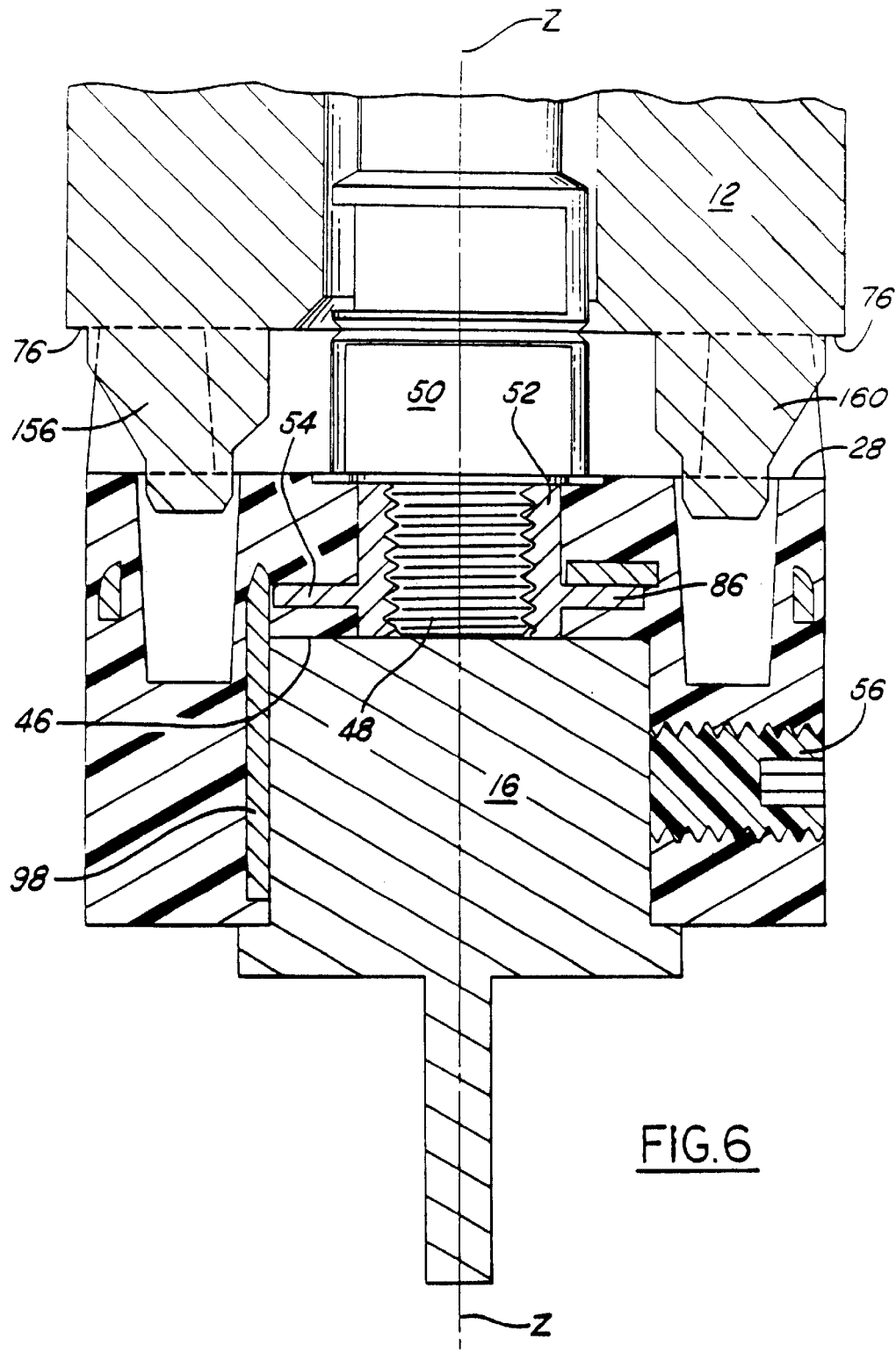
FIG. 6 is a cross-sectional view taken on the line 6—6 of FIG.

With the foregoing background, and turning again to our disclosure, the plastic body member 18 has four side faces 20, 22, 24 and 26, and opposite top and bottom flat parallel faces 28 and 30. The body member may be provided with open-ended voids as at 32, 34 to conserve the amount of resin required to form the body and to maximize the strength and stability of the block. The voids may also be arranged to provide a means for holding an EDM tool on the block in the form of a clamping chamber 36 opening through the bottom face 30 and having four walls 38, 40, 42 and 44 which are perpendicular to the bottom face 30. A bottom wall or face 46 of the chamber has a threaded locking-pin or draw-bar-receiving bore 48 for threaded mounting of a locking pin or draw bar 50 as shown in FIG. 6. Such locking pin or draw bar is similar to that shown in U.S. Pat. Nos. 4,815,780 and 4,855,558 and is well understood by those skilled in the art and need not be further described. The bore 48 is formed in a nut 52 having a lateral flange 54. The nut may be formed of metal, such as brass, and insert-molded in the body member at the time the latter is injection molded. The axis of the threaded bore 48 of the nut is perpendicular to the bottom wall or face 46 of the tool clamping chamber 36, and lies on the Z-axis of the holder 10.

Figure 2:
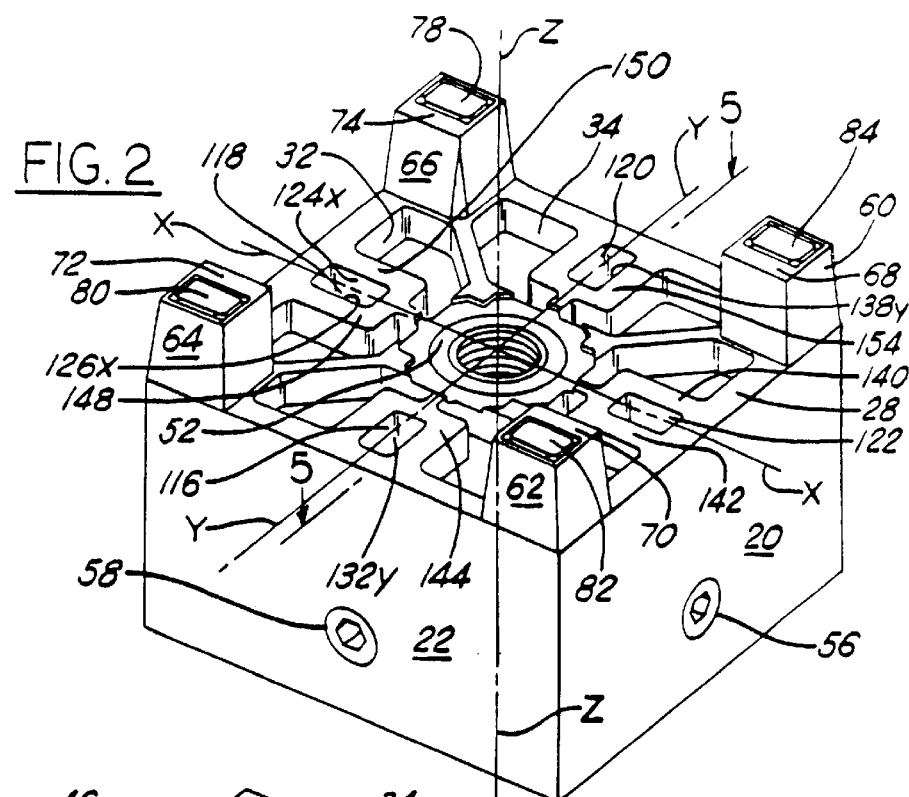
FIG. 2 is a top perspective view of our improved tool holder.
Figure 3:
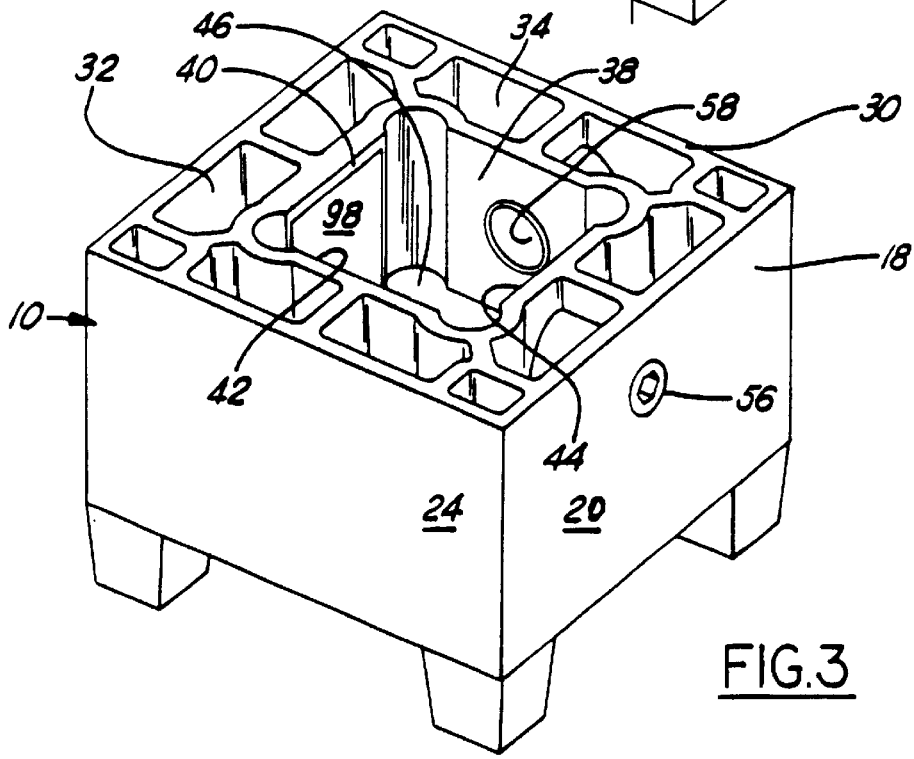
FIG. 3 is a bottom perspective view of our improved tool holder.

As shown in FIGS. 2, 3 and 6, set screws 56 and 58 are threaded into the body member and have wrench engaging exposed outer ends at faces 20 and 22 and project inwardly into the tool chamber through faces 38 and 44 to engage and hold the tool 16 in firm contact with faces 40, 42 and 46 of the clamping chamber in a fashion similar to that shown in U.S. Pat. No. 4,621,821. The clamping chamber 36 and set screws 56 and 58 provide a means for mounting or locking the EDM electrode or tool on the body member.

Projecting upwardly at the four corners of the body member 18 are legs 60, 62, 64 and 66 which are integrally molded with the body member. At the upper end of each of these legs there is an end face reference surface 68, 70, 72 and 74 described in more detail hereafter. These end face reference surfaces lie in a common X-Y plane which is perpendicular to the Z-axis of the body member and parallel to the X-Y plane of the top face 28 of the body member. These end face reference surfaces are adapted to rest in firm contact against the underside face 76 of the coupling member or chuck by the pulling action of the locking pin or draw bar 50. The face 76 is planely ground such that it lies exactly parallel to the X-Y plane. The end face reference surfaces 68, 70, 72 and 74 thus determine the Z-distance or Z-position of the tool holder (and in turn an EDM tool carried by it) in relation to the chuck 12 and position the tool holder in an X-Y plane which is exactly parallel to the X-Y plane of the chuck 12 of the EDM machine (and perpendicular to the Z-axis of the chuck 12).

Figure 4:
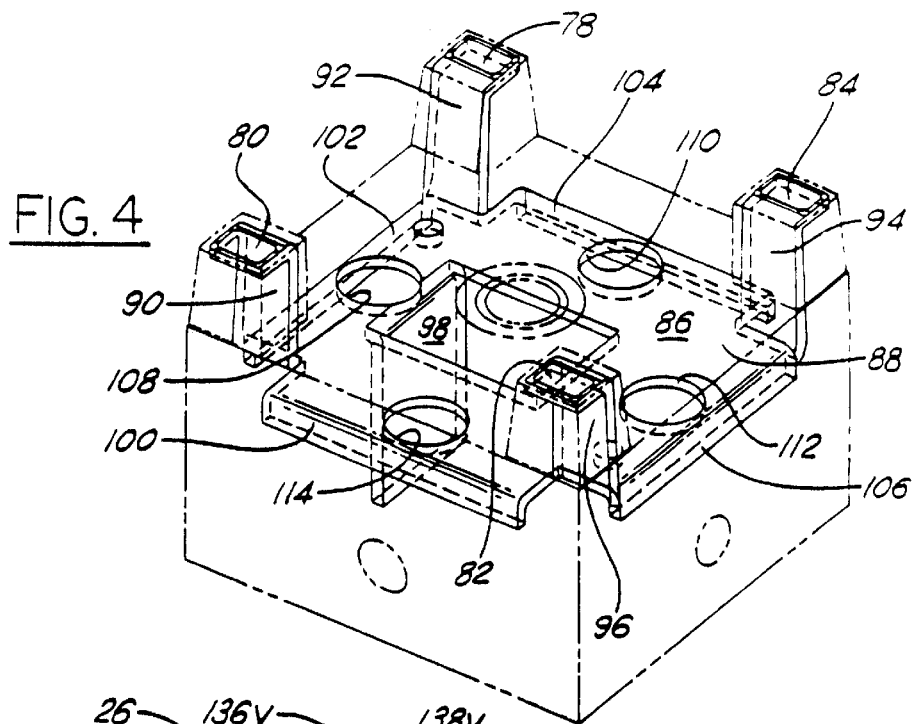
FIG. 4 is a top perspective view similar to FIG. 2 except the tool holder is shown in phantom outline, while the electric conductor is shown in solid outline.

Embedded in the ends of legs 60, 62, 64 and 66 by insert molding and projecting slightly thereabove are end portions 78, 80, 82 and 84 of an electrical conductor element 86 best shown in FIGS. 2 and 4. Such exposed portions define the aforementioned end face reference surfaces 68, 70, 72 and 74. The conductor element is made of half-hard copper or other good electrical conductive material, and is inserted-molded in the body member. It may be formed of one piece of copper shaped as shown in FIG. 4. In the embodiment shown, element 86 has a plate portion 88 of generally square shape with four upwardly bent legs or risers at the corners, as at 90, 92, 94 and 96. Each riser or leg extends at approximately 90° to the flat plate portion 88, and is itself bent at about 90° near its upper end to form the end portions 78, 80, 82 and 84. The ends 78, 80, 82 and 84 will lie in firm abutting contact with the planely ground surface 76 of the chuck when the tool holder is drawn thereagainst by the locking pin or draw bar 50. The plastic material of legs 60, 62, 64 and 66 underlies and marginally surrounds the end portions 78, 80, 82 and 84 to support such ends for contact with the surface 76. The conductor end portions project slightly above the plastic material at the ends of the legs to assure good electrical contact with the opposing face 76 of the chuck.

It is intended that the conductor portions 78, 80, 82 and 84 have exposed surfaces 68, 70, 72 and 74 that define the aforementioned x-y reference plane simply as a result of the insert molding of the conductor in the block. However, it will be understood that following the insert molding, if the surfaces 68, 70, 72 and 74 are not suitable, they may be dressed in a separate operation.

A central area 98 of the flat plate portion 88 is bent downwardly as best shown in FIGS. 4 and 6 and is embedded in but projects slightly above the face 40 of the tool receiving cavity 36 and forms a downwardly extending tab against which an EDM tool or electrode 16 will be urged in mating contact when the screw 56 is tightened against such tool clamping it against tab 98. The marginal edges 100, 102, 104 and 106 are bent downwardly as shown. Four through apertures 108, 110, 112 and 114 are formed in the flat plate portion 88 of the conductor element in alignment with four locating pockets 116, 118, 120 and 122. It will be noted in FIG. 6 that flange 54 of the nut 52 may be in abutting and electrically conductive relationship with the conductor element.

Figure 5:
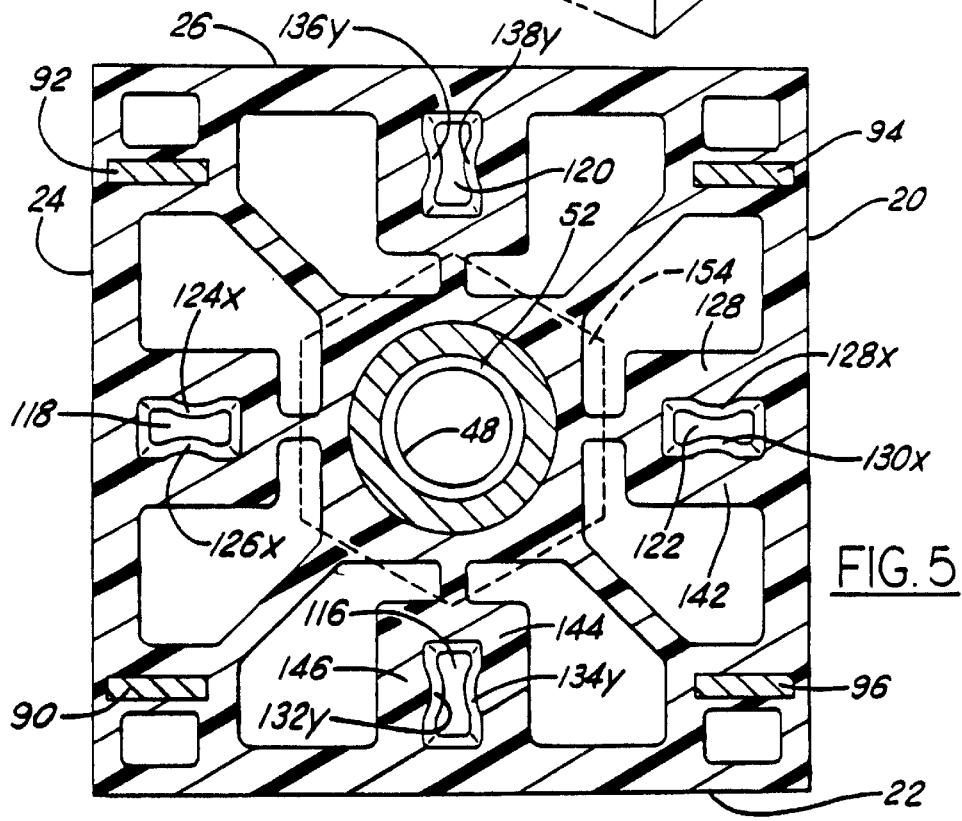
FIG. 5 is a cross-sectional view taken on the line 5—5 of FIG. 2.

Locating pockets, in combination with the reference end faces 68, 70, 72 and 74, determine the exact X-Y and Z-position of the tool holder (and in turn the EDM tool) in relation to the chuck 12. The pockets are formed in the plastic body member 18 to open upwardly through the top face 28. The pockets are arranged in pairs. One pair 118 and 122 lies on the X-axis of the holder, the other pair 116 and 120 lies on the Y-axis of the holder as shown in FIG. 2. Each pocket has a pair of opposed slightly convex tapering positioning faces as shown in FIG. 5. The convexity of such faces is slightly exaggerated in the drawings to emphasize its presence. For pockets 118 and 122, these faces are designated 124$x$ and 126$x$ and 128$x$ and 130$x$, respectively. Such faces are opposed to each other along the X-axis, but tapered toward each other along the Z-axis moving from top face 28 downwardly into the body member. Thus, it may be said of these pairs of faces 124$x$, 126$x$ and 128$x$, 130$x$ that they are generally parallel to the X-axis. In short, we may refer to them herein as opposed inwardly tapering X-axis faces.

Similarly, pockets 116 and 120 have opposed convex tapering positioning faces 132$y$, 134$y$ and 136$y$, 138$y$ which are generally parallel to each other along the Y-axis, but taper toward each other along the Z-axis moving from top face 28 downwardly into the body member. Thus, it may be said of these pairs of faces 132$y$, 134$y$ and 136$y$, 138$y$ that they are generally parallel to the Y-axis. In short, we may refer to them herein as opposed inwardly tapering Y-axis faces.

Faces 124$x$ through 138$y$ are the exposed surfaces of the slightly resilient walls of each pocket. Thus, for pocket 116 there are walls 144, 146; for pocket 118 there are walls 148, 150; for pocket 120 there are walls 152, 154; for pocket 122 there are walls 140, 142. These walls are formed by the voids 32 in the body member.

Figures 7, 8:
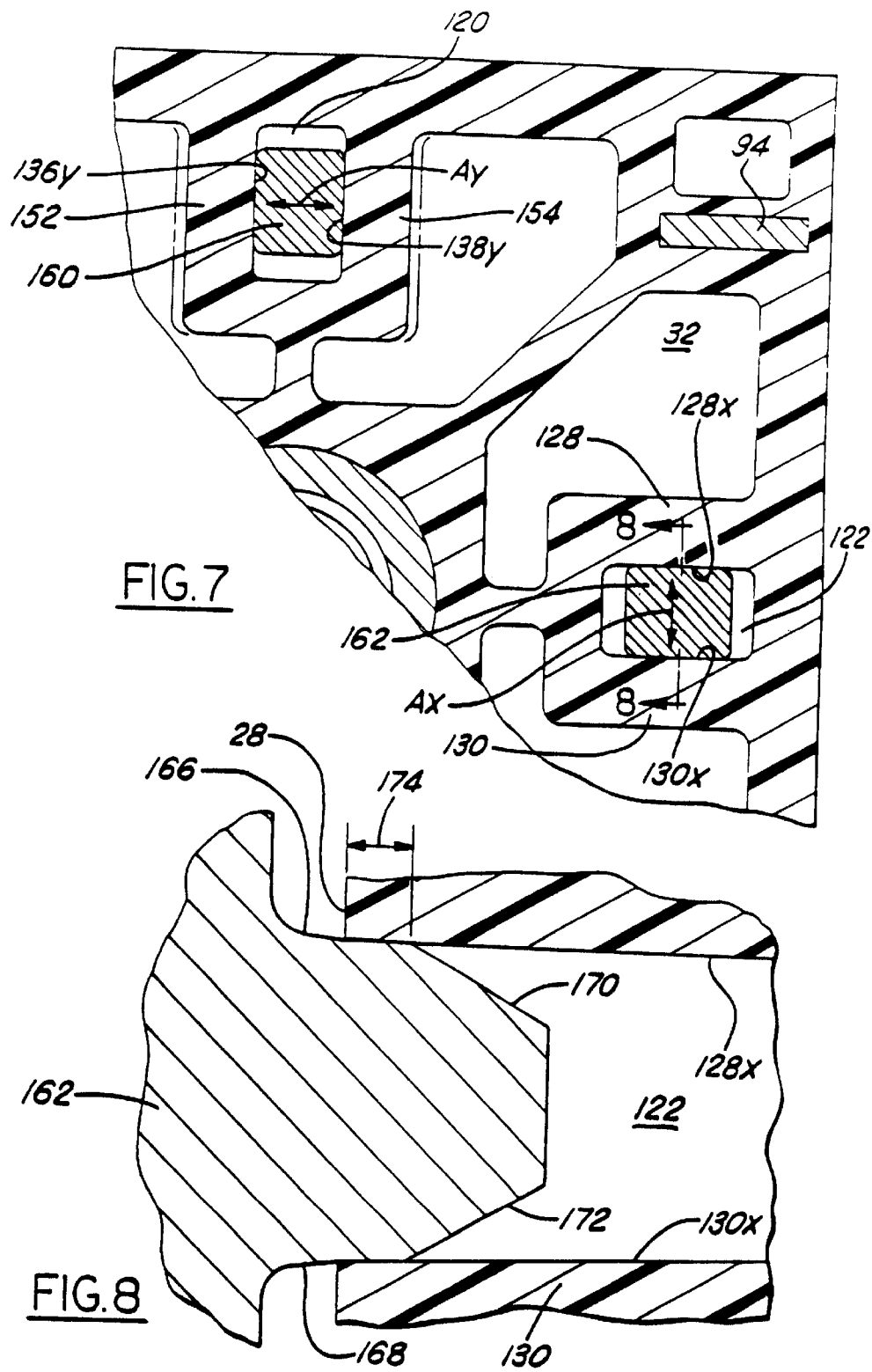
FIG. 7 is a cross-sectional view taken on the line 7—7 of FIG. 1.
FIG. 8 is a cross-sectional view taken on the line 8—8 of FIG. 7.
Figure 9:
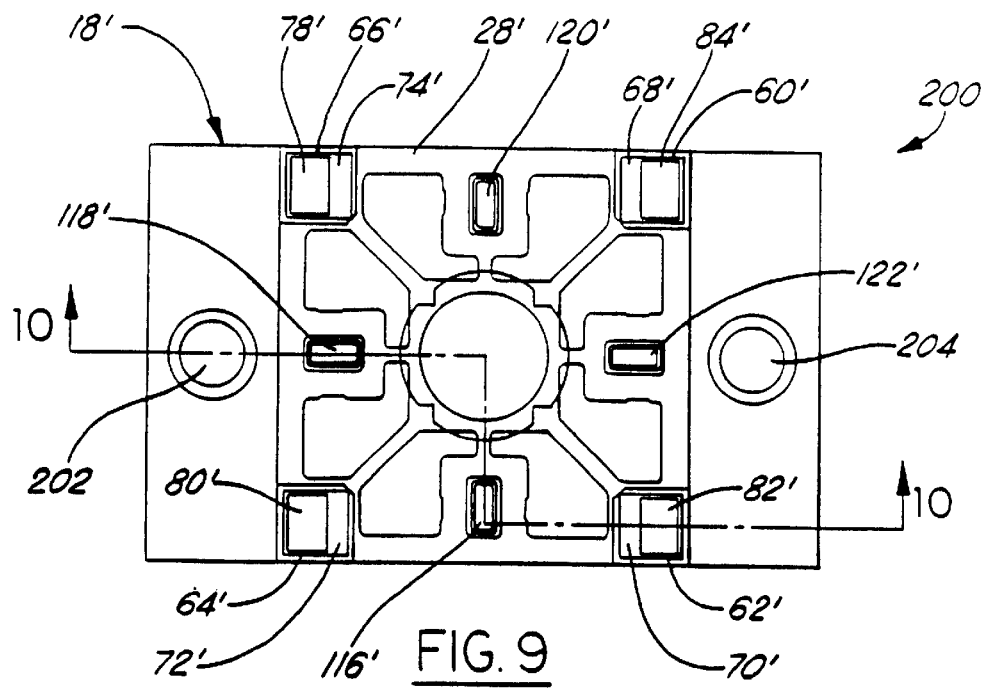
FIG. 9 is a top view of our improved tool holder in accordance with an alternative embodiment of the present invention.

These opposed convex walls, because of the slightly resilient nature of the plastic from which the plastic body 18 is formed, will resistingly flex laterally in the direction of the arrows $A_x$ and $A_y$ shown in FIG. 7. The flat sides of the pins will initially make a line contact with the convex walls of the pockets, but as the pins are pushed deeper into the pockets, the walls will flatten to match the sides of the pins and will appear flat in FIG. 7. Thus, the opposed walls 136$y$, 138$y$, 128$x$ and 130$x$, and the remaining corresponding walls of the pockets, will tightly grip the pins positioning the holder in the proper X-Y orientation. Such flexure occurs as the flat sided locating pins 156, 158, 160 and 162 of the tool chuck or coupling member 12 are pushed down into the pockets as the locking pin or draw bar pulls the tool holder and chuck together. It will be noted that the design makes use of the resilient character of the plastic of which the body member 18 is fabricated. Unlike the prior art where the flexure of the centering disk or the tool holder is along the Z-axis, in our design there is no flexure along the Z-axis, but only along the X and Y axes which are the directions in which the tool holder is to be accurately located.

To accomplish such locating, the pins 156–162 are generally similar to the rails 62–68 of U.S. Pat. No. 4,855,558 or the centering pins 47 of U.S. Pat. No. 4,815,780, namely they may be integrally formed with the chuck and project downwardly therefrom. As the nose portions are the same for each locating pin, a description of pin 162 suffices for all. The pin has a truncated nose portion 164 having opposed flat sides 166 and 168 which have a taper matching the taper of the confronting flexible walls 128$x$ and 130$x$, and a lead-in portion with more sharply tapering sides 170 and 172, all as best shown in FIG. 8.

The opposed X and Y walls (130$x$, 128$x$ or 136$y$, 138$y$) of the pockets have locating surfaces extending inwardly from the top face 28. We have found that such surfaces may be approximately 0.063 inches in axial length as indicated at 174 in FIG. 8. As the locating pin enters the pocket, once contact has been made between the flat faces 166 and 168 and the opposed convex walls 128$x$ and 130$x$ of the tool holder, the wall portions 128 and 130 will begin to resistingly flex apart, as indicated by the arrows $A_x$ or $A_y$ exactly locating the tool holder when the reference surface faces 68–74 bottom out at the under side face 76 of the coupling member or chuck 12.

In this disclosure, the chuck or coupling member 12 is electrified or part of an electric circuit which supplies the electric current for the machining to be carried out by the tool 16. Thus when the end reference faces 68–74 are brought into firm contact with the underface 76 of the coupling member, the copper conductor portions 78–84 not only accurately position the tool holder along the Z-axis, but also are in electrically conductive relation with the chuck whereby electric current is supplied to the tool 16. Current is also optionally supplied through the locking pin or drawbar 50.

In FIGS. 9–12 we have shown our improved tool holder 200 in accordance with an alternative embodiment of the present invention. Tool holder 200 is generally similar to tool holder 10 and primed reference numerals are used to indicate generally corresponding components. Tool holder 200, like tool holder 10, comprises a plastic body member 18' preferably formed by injection molding utilizing a tough durable plastic.

Figure 10:
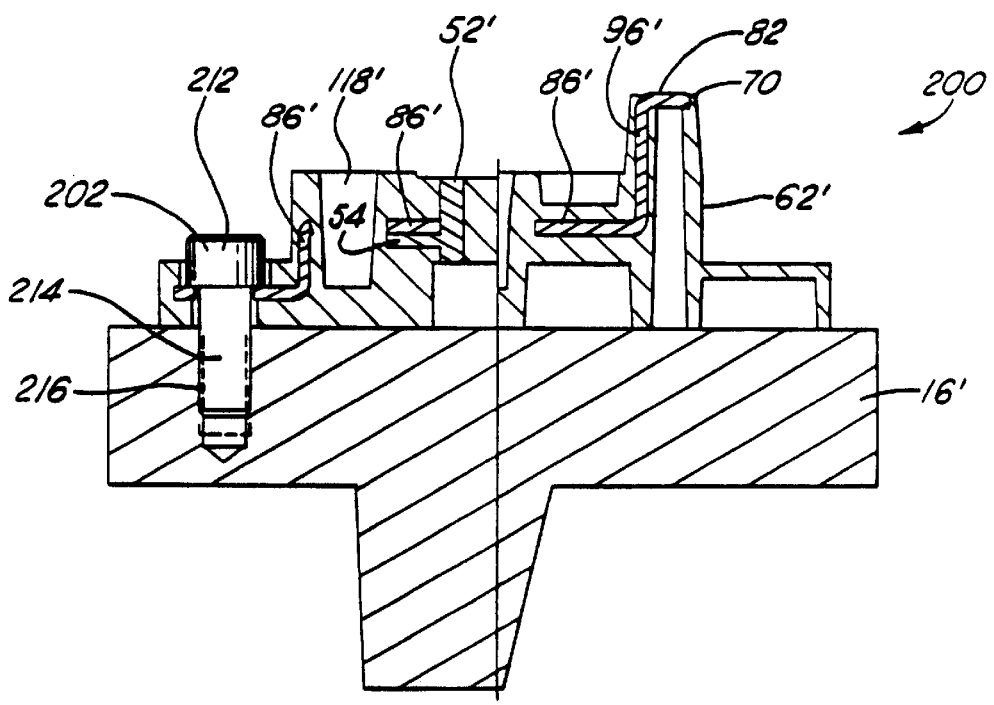
FIG. 10 is a cross-sectional view taken on the line 10—10 of FIG. 9.

Tool holder 200 generally differs from tool holder 10 in using electrically conductive bolts 202 and 204 directly attached to a tool 16' through respective apertures 208 and 210 in body member 18' instead of the clamping chamber and set screw combination used by tool holder 10. As best shown in FIG. 10, head 212 of bolt 202 is fastened down on conductor element 86' to make an electrical connection. Elongate body portion 214 of bolt 202 penetrates into receiving bore 216 of tool 206 to clamp the tool to tool holder 200 and electrically connect the tool to conductor element 86'. Thus, bolts 202 and 204 provide means for mounting a tool to body member 18' and exposed electric conductor means for electric contact with the tool mounted on the body member.

Figure 11:
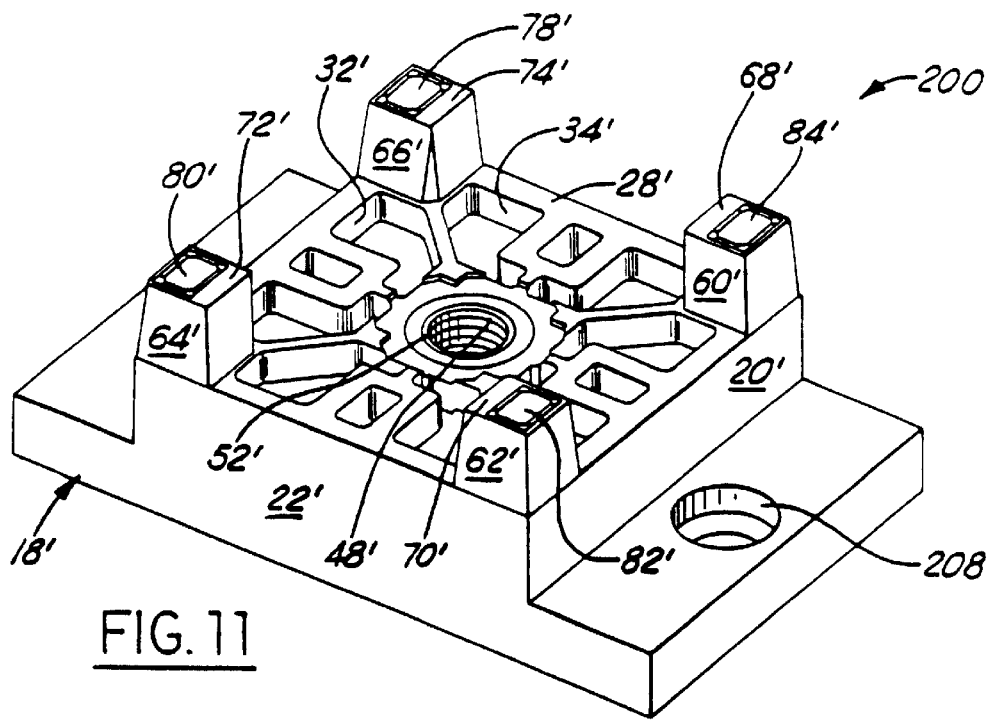
FIG. 11 is a top perspective view of our improved tool holder shown in FIG. 9.
Figure 12:
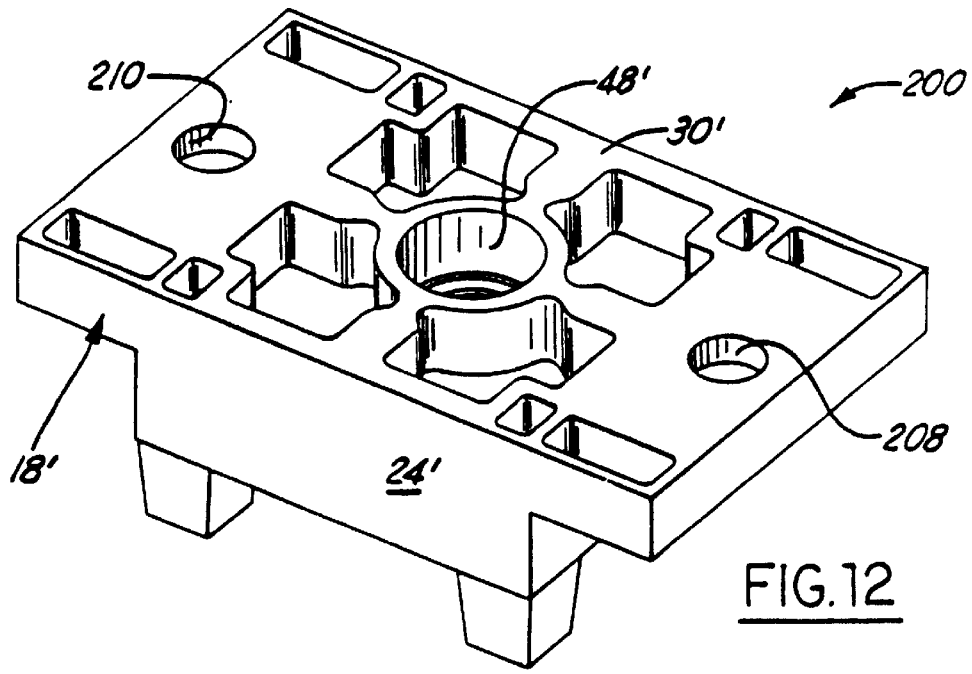
FIG. 12 is a bottom perspective view of our improved tool holder shown in FIG. 9.
Figure 13:
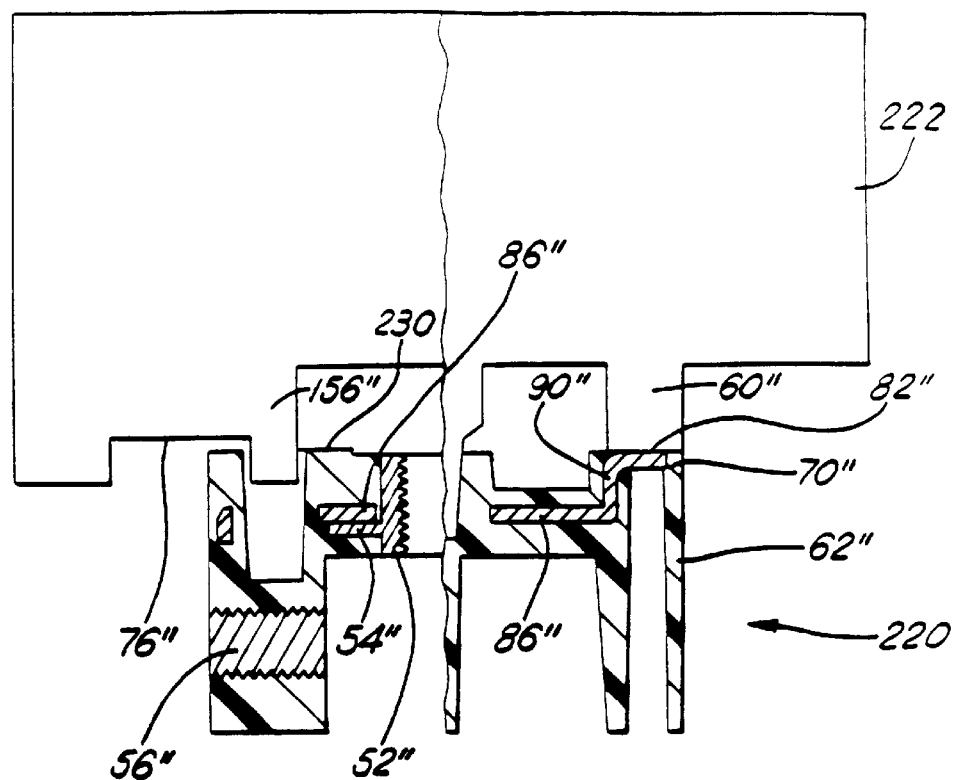
FIG. 13 is a cross-sectional view of our improved tool holder mounted onto the chuck of an EDM machine in accordance with a third embodiment of the present invention.
Figure 14:
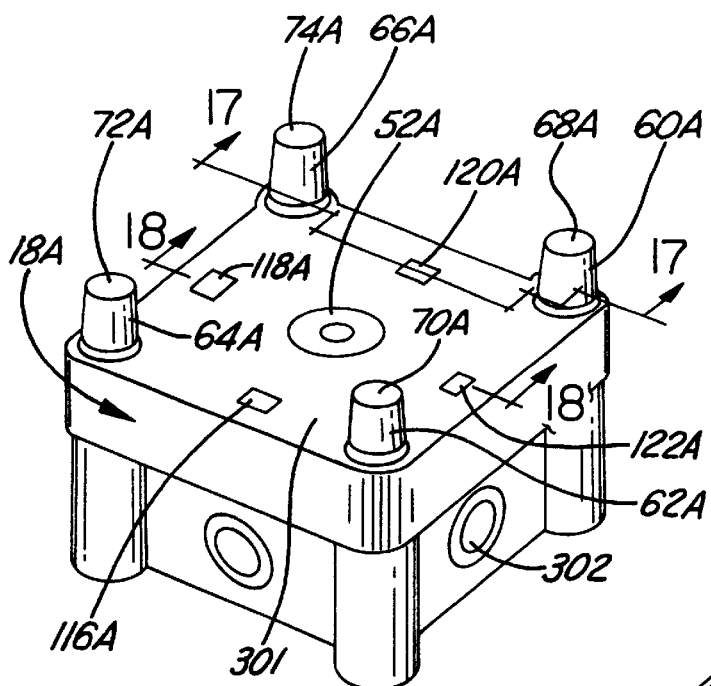
FIG. 14 is a perspective view of another embodiment of our improved tool holder in which a MIM core or the like is encased in the plastic block.

In FIG. 13 we have shown another alternative embodiment of the present invention in which our improved tool holder 220 is operable with an EDM machine chuck 222 having four downwardly projecting legs arranged in a pattern similar to the legs of the tool holder 200, i.e., 60', 62', 64' and 66', of FIG. 11. Chuck 222 is, of course, electrically conductive. Tool holder 220 generally differs from tool holder 10 and 200 in that it has no upwardly projecting legs but rather a generally flat upper surface 230 and is for use with a chuck having the aforesaid four downwardly projecting legs such as the leg 60". Tool holder 220 has locating reference faces, one of which is shown 70". These reference faces are similar to the surfaces to the surfaces 68', 70', 72' and 74' shown in FIG. 9 but are not locating on the ends of legs but rather in the generally flat upper surface 230. Such reference surfaces lie in a common X-Y plane and are adapted to abut in firm contact the lower ends of legs 60", 62", 64" and 66" which project downwardly from the chuck 222. The legs and reference surfaces are pulled together and held in such abutting contact by the pulling action of the aforementioned draw bar. The reference surfaces 70", etc., and the downwardly projecting legs 60", etc., thus determine the Z-distance in relation to chuck 222 and position the tool holder in an X-Y plane which is exactly parallel to the X-Y plane of the chuck 222 of the EDM machine.

Embedded in the end face reference surfaces 70" by insert molding and projecting slightly thereabove are conductor end portions such as end portion 82 of electrical conductor element 86". Other conductor end portions corresponding to 78', 80', and 84' are, of course, also present. Such conductor end portions project slightly above the plastic material of the end face reference surfaces to assure good electrical contact with the legs of chuck 222.

In FIGS. 14–18, we have shown a further embodiment of our improved tool holder for an EDM machine. Parts performing a similar function as parts earlier described have a capital A appended to their reference numbers. In this embodiment, the molded plastic block 18A encases a MIM (metal injection molding) core to provide a strong and essentially inflexible tool holding block. In the prior embodiments, the core was simply a conductor, not relied upon to rigidify the block. In lieu of a MIM core, the core may be formed of powdered metal or any other suitable material which will provide the requisite strength and electrical conductivity. Unlike the other embodiments of our tool holder heretofore discussed, the embodiment of FIGS. 14–18 has the legs 60A, 62A, 64A and 66A formed integrally with and of the core material with a hollow interior filled with the plastic 306 of the block and integral with the core and upstanding from the face 301 of the block as clearly shown in FIG. 14. At the upper or distal ends of the legs are reference faces 68A, 70A, 72A and 74A which function as their counterparts in the first described embodiment to locate the tool holder along a Z-axis on the EDM machine 12 against the face 76 best shown in FIG. 1.

Figure 15:
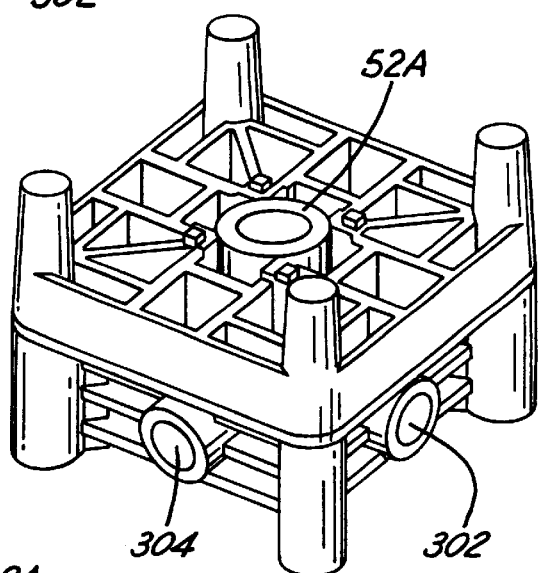
FIG. 15 is a perspective view of the core.

In FIG. 15, we have shown the tool holder core without the plastic encasing same. At the center of the core that portion 52A corresponding to the nut 52 in FIG. 6, is threaded as at 48A (FIG. 18) to receive a threaded locking pin or draw bar 50 similar to that shown in FIG. 6.

Figure 16:
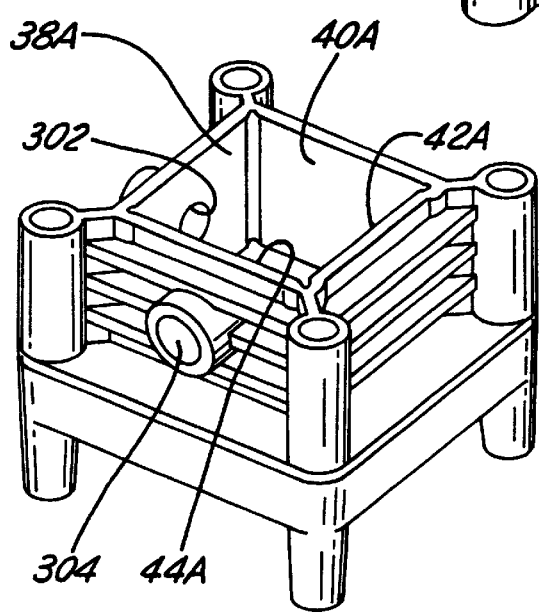
FIG. 16 is a perspective view of the core of FIG. 15 shown upside down.

The core is shaped to provide a tool chamber having walls 40A, 42A, 44A and 38A as shown in FIG. 16. Set screws, similar to those shown at 56 and 58 in FIG. 2 and 3, are received in threaded bores 302 and 304 in the walls of the tool chamber, shown in FIGS. 14–16 and 18 to urge a EDM tool (not shown—see FIG. 6 for similar arrangement) against the opposed walls 40A and 42A of the MIM core. Thus, the tool is locked in the block and pressed tightly against the exposed conductive faces 40A and 42A of the core.

Figure 17:
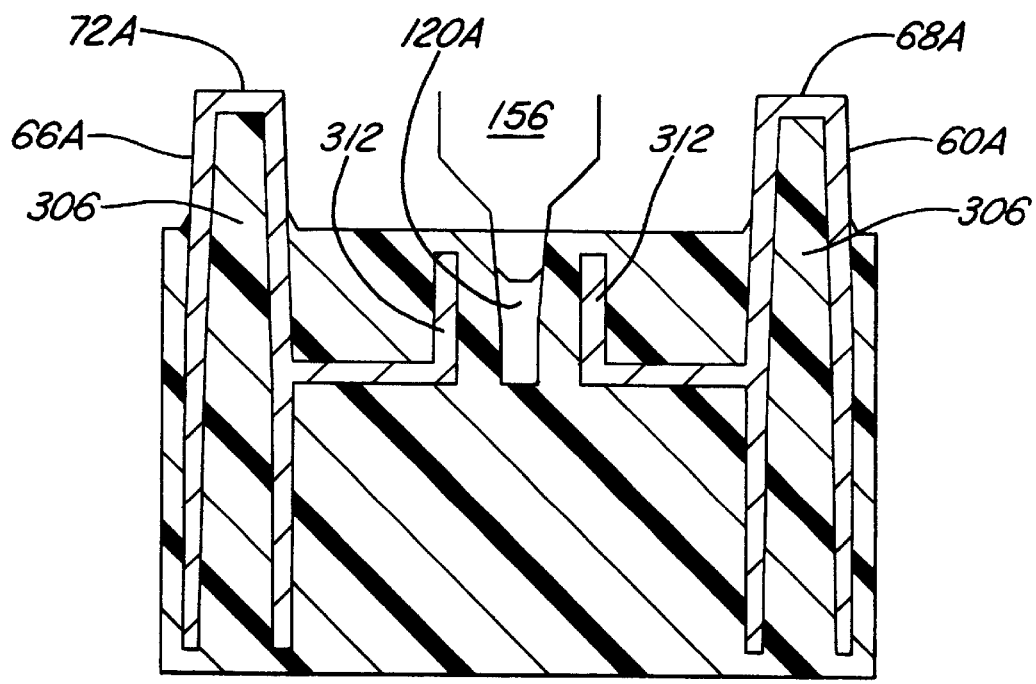
FIG. 17 is a cross-sectional view through the block taken on the line 17—17 of FIG. 14.
Figure 18:
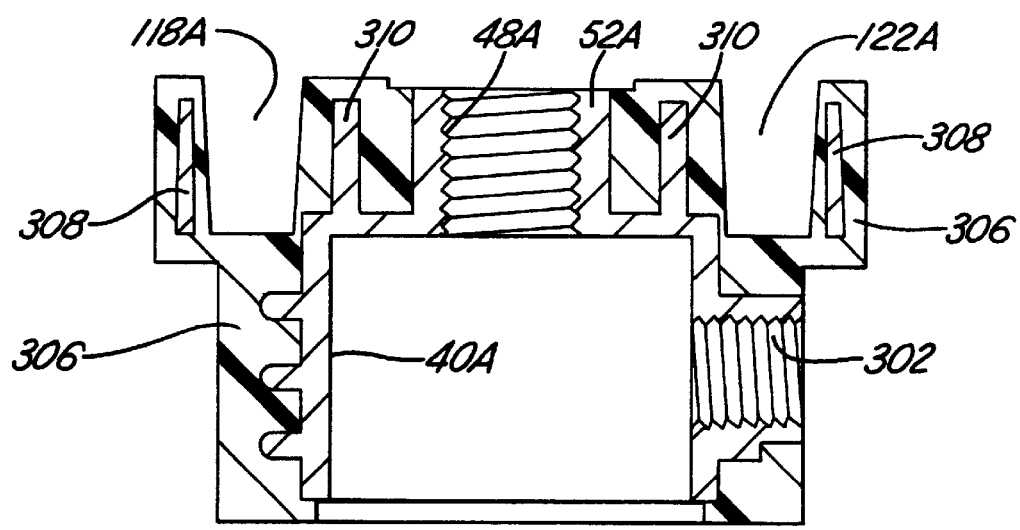
FIG. 18 is a cross-sectional view taken on the line 18—18 of FIG. 14.

As shown in FIG. 17, the legs typified by legs 66A and 60A upstand from the face of block 301 and provide reference faces 72A and 68A, respectively. The interior of the legs is filled with the plastic material of the block as at 306. Such plastic material fills the interstices or pockets between the wall-like ribs of the core and supports and reinforces the core against deflection when the tool is locked in the tool chamber or the tool holder is locked against the EDM machine and during operation of the EDM machine to perform its intended function. This is also well shown in FIG. 18 where the plastic material 306 backs up the wall 40A of the core and encases the core walls 308 and 310 on opposite sides of the pin receiving pockets 118A and 122A (FIG. 18). Thus, while the pin receiving and locating pockets 116A, 118A, 120A, 122 A establish the locations in the X- and Y-axes engage the plastic of the block as in the first described embodiment, portions 308 and 310 of the core adjacent each pocket back up and reinforce the pocket walls so that the block will better withstand the forces imposed on it during operation of the EDM machine. In FIG. 17, we have shown a locating pin 156 on the EDM machine entering the locating pocket 120A while the portions 312 of the core, lying adjacent opposite walls of the pocket serve to reinforce or back up such walls and prevent deflection thereof beyond what is permitted. It is believed such reinforcement or backing up of the plastic material contributes significantly to the stability of the tool holder and contributes to the repeatability of its accuracy in holding the tool holder in exactly the right position during repeated mountings and dismountings of the tool holder from the EDM machine.

The metal core is essentially rigid while the plastic of the block is slightly compressible or slightly flexible. Thus, the core limits this flexibility of the plastic and rigidities the hole structure to ensure the repeatable accuracy of the tool holder.

Thus, we have provided a tool holder for an EDM machine that may be fabricated very inexpensively and which at the same time avoids the prior art problem of losing its accuracy if it is bumped and will serve to hold the EDM tool for accurate repeated positioning in the EDM machine.

What is claimed is:

1. A tool holder for electric discharge machining (EDM) comprising:

a block of molded plastic;

means for mounting an EDM tool on said block;

an electrically conductive rigid core molded into the block and arranged to complete an electric circuit with the EDM tool mounted on the block and rigidfy the block;

said core having reference faces exposed on the block for abutting a mounting face on an EDM machine to position the block in a Z direction and establish an electric circuit between the EDM tool mounted on the block and the EDM machine; and means for clamping the block on the EDM machine to urge said reference faces against the mounting face of such machine.

2. A tool holder for electric discharge machining (EDM) comprising:

a block of molded plastic;

means for mounting an EDM tool on the block;

an electrically conductive rigid core at least partially embedded in said block and electrically connected to the EDM tool on the block;

said core having electrically conductive legs projecting from one side of said block for supporting the block on a mounting face of an EDM machine to complete an electric circuit between the EDM machine and the EDM tool mounted on the block;

the distal ends of said legs having reference faces for positioning the block, and in turn the EDM tool mounted thereon, in a Z direction on the EDM machine; and means for clamping the block on the EDM machine to urge said reference faces against the mounting face of such machine.

3. The invention defined by claim 1 wherein said core is a metal injection molding (MIM).

4. The invention defined by claim 2 wherein said core is a metal injection molding (MIM).

5. The invention defined by claim 4 wherein said core is shaped to provide said legs.

6. The invention defined by claim 3 wherein the core is shaped to provide an EDM tool-receiving chamber opening outwardly of the block at that side opposite said reference faces and a portion of said core is exposed for contact with the EDM tool received in said chamber.

7. The invention defined by claim 4 wherein the core is shaped to provide an EDM tool-receiving chamber opening outwardly of the block at that side opposite said legs and a portion of said core is exposed for contact with the EDM tool received in said chamber.

8. The invention defined by either claim 3 or 4 wherein the core is shaped to provide a portion exposed for contact with the EDM tool mounted on the block.

9. The invention of claim 1 wherein said locating reference faces are adapted to abut legs on a mounting face on the EDM machine.

10. The invention of either claim 1 or 2 wherein said block has a plurality of locating pins receiving pockets molded therein for locating the block in X- Y- directions, and said core has conductor has integral relatively rigid web portions arranged adjacent said locating pin receiving pockets in the block to reinforce the pocket walls against undesired deflection.

11. The invention of either claim 1 or 2 wherein positioning means are provided on the tool holder cooperating with the EDM machine upon which the holder is adapted to be mounted to position the holder in an X-Y plane.

12. The invention defined by claim 2 wherein said core is shaped to provide an EDM tool-receiving chamber opening outwardly of the block on that side opposite said legs, and a portion of said core is adapted to contact the EDM tool.

13. The invention defined in claim 5 wherein said block is shaped to provide portions overlying and reinforcing walls of the EDM tool-receiving chamber.

14. The invention defined by claim 10 wherein said core has relatively rigid portions embedded in the plastic block adjacent the pin receiving pockets to prevent unwanted deflection of the block in said pockets.

* * * * *